US012180439B2

(12) United States Patent
Blattner et al.

(10) Patent No.: US 12,180,439 B2
(45) **Date of Patent: *Dec. 31, 2024**

(54) ALKYL AMIDES FOR ENHANCED FOOD SOIL REMOVAL AND ASPHALT DISSOLUTION

(71) Applicant: ECOLAB USA INC., Saint Paul, MN (US)

(72) Inventors: Amanda Ruth Blattner, Saint Paul, MN (US); Charles Allen Hodge, Saint Paul, MN (US); Mark Dennis Levitt, Saint Paul, MN (US); Nathan D. Peitersen, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,176

(22) Filed: Oct. 25, 2023

(65) Prior Publication Data

US 2024/0052271 A1 Feb. 15, 2024

Related U.S. Application Data

(63) Continuation of application No. 16/250,735, filed on Jan. 17, 2019, now Pat. No. 11,834,624, which is a (Continued)

(51) Int. Cl.
*C11D 1/40* (2006.01)
*C11D 1/02* (2006.01)
(Continued)

(52) U.S. Cl.
CPC .................. *C11D 3/43* (2013.01); *C11D 1/02* (2013.01); *C11D 1/652* (2013.01); *C11D 3/2003* (2013.01);
(Continued)

(58) Field of Classification Search
CPC ..... C11D 1/023; C11D 3/2003; C11D 3/2006; C11D 3/2041; C11D 3/2068; C11D 3/32; C11D 3/33
(Continued)

(56) References Cited

U.S. PATENT DOCUMENTS

| | | | |
|---|---|---|---|
| 4,488,981 | A | 12/1984 | Urfer et al. |
| 5,001,114 | A | 3/1991 | McDaniel, Jr. |

(Continued)

FOREIGN PATENT DOCUMENTS

| | | | |
|---|---|---|---|
| CA | 2246339 | A1 | 8/1997 |
| EP | 0086614 | B1 | 8/1983 |

(Continued)

OTHER PUBLICATIONS

CCI, "Poly Suga Mate, Naturally Derived, APG-Based Sulfosuccinate Surfactants", 2 pages. Dec. 31, 2008.

(Continued)

*Primary Examiner* — Gregory R Delcotto
(74) *Attorney, Agent, or Firm* — McKee, Voorhees & Sease, PLC

(57) ABSTRACT

The present invention comprises a hard surface cleaning composition including an environmentally friendly alkyl amide solvent, derived from renewable bio-based resources that works at least as well as d-limonene. In one embodiment, the present invention is a cleaning composition including an anionic surfactant salt, a saturated $C_8$ to $C_{10}$ alkyl amide solvent, a cosolvent and water. The composition is substantially free of d-limonene and can remove red food soils with up to 20 percent protein, and also functions as an asphalt removal composition.

11 Claims, 2 Drawing Sheets

Related U.S. Application Data continuation of application No. 14/201,265, filed on Mar. 7, 2014, now abandoned.

(51) Int. Cl.

| | |
|---|---|
| ***C11D 1/65*** | (2006.01) |
| ***C11D 3/20*** | (2006.01) |
| ***C11D 3/32*** | (2006.01) |
| ***C11D 3/33*** | (2006.01) |
| ***C11D 3/43*** | (2006.01) |
| *C11D 1/52* | (2006.01) |

(52) U.S. Cl.

CPC .......... *C11D 3/2006* (2013.01); *C11D 3/2041* (2013.01); *C11D 3/2068* (2013.01); *C11D 3/32* (2013.01); *C11D 3/33* (2013.01); *C11D 1/521* (2013.01); *C11D 2111/14* (2024.01)

(58) Field of Classification Search

USPC ....... 510/235, 238, 432, 434, 480, 499, 501, 510/505, 506

See application file for complete search history.

(56) References Cited

U.S. PATENT DOCUMENTS

| | | | |
|---|---|---|---|
| 5,118,440 | A | 6/1992 | Cutler et al. |
| 5,179,201 | A | 1/1993 | Oftring et al. |
| 5,254,290 | A | 10/1993 | Blandiaux et al. |
| 5,342,534 | A | 8/1994 | Skrobala et al. |
| 5,527,483 | A | 6/1996 | Kenkare et al. |
| 5,631,216 | A | 5/1997 | Morris et al. |
| 5,691,289 | A | 11/1997 | Purcell et al. |
| 5,780,417 | A | 7/1998 | Gorlin |
| 5,807,816 | A | 9/1998 | Cottrell et al. |
| 5,849,095 | A | 12/1998 | Rouillard |
| 5,851,973 | A | 12/1998 | Foley |
| 5,948,742 | A | 9/1999 | Chang et al. |
| 6,060,441 | A | 5/2000 | Hessel et al. |
| 6,110,295 | A | 8/2000 | Lu et al. |
| 6,121,228 | A | 9/2000 | Drapier et al. |
| 6,194,371 | B1 | 2/2001 | Donovan et al. |
| 6,369,021 | B1 | 4/2002 | Man et al. |
| 6,384,010 | B1 | 5/2002 | Wagers |
| 6,627,612 | B1 | 9/2003 | O'Lenick, Jr. et al. |
| 6,683,036 | B2 | 1/2004 | Foley |
| 6,696,399 | B1 | 2/2004 | Chernin et al. |
| 6,740,628 | B2 | 5/2004 | Bennie |
| 6,759,382 | B2 | 7/2004 | Ahmed |
| 6,800,741 | B1 | 10/2004 | O'Lenick, Jr. |
| 6,812,202 | B2 | 11/2004 | Man et al. |
| 6,881,710 | B1 | 4/2005 | O'Lenick, Jr. et al. |
| 6,927,237 | B2 | 8/2005 | Hei et al. |
| 6,958,315 | B1 | 10/2005 | Anderson et al. |
| 6,964,942 | B2 | 11/2005 | Murch et al. |
| 7,008,930 | B1 | 3/2006 | O'Lenick, Jr. et al. |
| 7,045,506 | B1 | 5/2006 | O'Lenick, Jr. et al. |
| 7,084,129 | B1 | 8/2006 | Smith et al. |
| 7,087,571 | B1 | 8/2006 | O'Lenick, Jr. et al. |
| 7,335,627 | B1 | 2/2008 | O'Lenick et al. |
| 7,341,983 | B2 | 3/2008 | Pedersen et al. |
| 7,375,064 | B1 | 5/2008 | O'Lenick, Jr. |
| 7,417,020 | B2 | 8/2008 | Fevola et al. |
| 7,446,086 | B2 | 11/2008 | Bauer et al. |
| 7,503,332 | B2 | 3/2009 | Gross et al. |
| 7,507,399 | B1 | 3/2009 | O'Lenick, Jr. |
| 7,521,413 | B2 | 4/2009 | Ochomogo et al. |
| 7,534,760 | B2 | 5/2009 | Johansson et al. |
| 7,585,830 | B2 | 9/2009 | Behler et al. |
| 7,608,573 | B1 | 10/2009 | Scheuing et al. |
| 7,629,305 | B1 | 12/2009 | Szekeres et al. |
| 7,754,670 | B2 | 7/2010 | Lange et al. |
| 7,803,746 | B2 | 9/2010 | Luu et al. |
| 7,939,486 | B2 | 5/2011 | Scheuing et al. |
| 9,133,426 | B2 | 9/2015 | Hunt, Jr. |
| 9,487,735 | B2 * | 11/2016 | Hunt, Jr. .................. C11D 3/43 |
| 11,834,624 | B2 * | 12/2023 | Blattner .................. C11D 1/02 |
| 2002/0035051 | A1 | 3/2002 | Alam et al. |
| 2002/0055448 | A1 | 5/2002 | Ruggiero et al. |
| 2002/0151448 | A1 | 10/2002 | Mitra et al. |
| 2002/0169099 | A1 | 11/2002 | Knox et al. |
| 2002/0183222 | A1 | 12/2002 | Foley et al. |
| 2002/0189028 | A9 | 12/2002 | Mettrie et al. |
| 2003/0050201 | A1 | 3/2003 | Guillou et al. |
| 2003/0064910 | A1 | 4/2003 | Fong et al. |
| 2003/0073600 | A1 | 4/2003 | Avery et al. |
| 2003/0119689 | A1 | 6/2003 | Hutton et al. |
| 2003/0134765 | A1 | 7/2003 | Kapur et al. |
| 2003/0139315 | A1 | 7/2003 | Man |
| 2004/0022818 | A1 | 2/2004 | Cho et al. |
| 2004/0029752 | A1 | 2/2004 | Sava et al. |
| 2004/0077516 | A1 | 4/2004 | Man et al. |
| 2004/0149311 | A1 | 8/2004 | Foley |
| 2004/0182425 | A1 | 9/2004 | Kravitz et al. |
| 2004/0214722 | A1 | 10/2004 | Wurtz et al. |
| 2005/0020473 | A1 | 1/2005 | Gallotti et al. |
| 2005/0101508 | A1 | 5/2005 | Winter et al. |
| 2005/0215449 | A1 | 9/2005 | Penninger et al. |
| 2005/0233925 | A1 | 10/2005 | Foley |
| 2005/0239674 | A1 | 10/2005 | Dreja et al. |
| 2006/0030512 | A1 | 2/2006 | Hart |
| 2006/0134239 | A1 | 6/2006 | Weide et al. |
| 2006/0135397 | A1 | 6/2006 | Bissey-Beugras et al. |
| 2006/0222614 | A1 | 10/2006 | Buck |
| 2006/0229230 | A1 | 10/2006 | Bauer et al. |
| 2006/0281653 | A1 | 12/2006 | Hutton et al. |
| 2007/0032395 | A1 | 2/2007 | Fornara et al. |
| 2007/0259797 | A1 | 11/2007 | Fevola et al. |
| 2007/0265183 | A1 | 11/2007 | Meine et al. |
| 2008/0039357 | A1 | 2/2008 | Gross et al. |
| 2008/0139443 | A1 | 6/2008 | Buzinski et al. |
| 2008/0255014 | A1 | 10/2008 | Luu et al. |
| 2009/0007936 | A1 | 1/2009 | Uhl et al. |
| 2009/0047232 | A1 | 2/2009 | Orubor et al. |
| 2009/0081755 | A1 | 3/2009 | Schmiedel et al. |
| 2009/0156454 | A1 | 6/2009 | Schmiedel et al. |
| 2010/0056416 | A1 | 3/2010 | Scheuing et al. |
| 2010/0081596 | A1 | 4/2010 | Rong |
| 2010/0160201 | A1 | 6/2010 | Scheuing et al. |
| 2010/0303739 | A1 | 12/2010 | Spoerer et al. |
| 2011/0009309 | A1 | 1/2011 | Mertens |
| 2011/0146725 | A1 | 6/2011 | Woo |
| 2012/0046208 | A1 | 2/2012 | Hodge et al. |
| 2012/0070341 | A1 | 3/2012 | Eder et al. |
| 2012/0071385 | A1 | 3/2012 | Hodge et al. |
| 2012/0071386 | A1 | 3/2012 | Hodge et al. |
| 2012/0071438 | A1 | 3/2012 | Pedersen et al. |
| 2012/0148514 | A1 | 6/2012 | Musa et al. |
| 2012/0295831 | A1 | 11/2012 | Masters |
| 2013/0037749 | A1 | 2/2013 | Hailu et al. |
| 2013/0225470 | A1 | 8/2013 | Allen et al. |
| 2013/0303422 | A1 | 11/2013 | Hunt, Jr. et al. |
| 2014/0045698 | A1 | 2/2014 | Musa et al. |
| 2015/0098745 | A1 | 4/2015 | Brown et al. |

FOREIGN PATENT DOCUMENTS

| | | | |
|---|---|---|---|
| EP | 0140452 | A2 | 5/1985 |
| EP | 0623670 | A2 | 11/1994 |
| EP | 0659874 | A1 | 6/1995 |
| EP | 0691397 | A2 | 1/1996 |
| EP | 0805200 | A1 | 11/1997 |
| EP | 1027420 | B1 | 8/2000 |
| EP | 1077250 | B1 | 2/2001 |
| EP | 1290122 | B1 | 3/2003 |
| GB | 2194955 | A | 3/1988 |
| GB | 2272450 | A | 5/1994 |
| GB | 2290798 | A | 1/1996 |
| GB | 2336373 | A | 10/1999 |
| GB | 2370042 | A | 6/2002 |
| JP | 4339897 | A | 11/1992 |
| JP | 200745991 | A | 2/2007 |
| JP | 2013032473 | A | 2/2013 |
| JP | 1992339897 | | 5/2013 |

(56) References Cited

FOREIGN PATENT DOCUMENTS

| | | | |
|---|---|---|---|
| JP | 2013100461 | A | 5/2013 |
| JP | 2013515093 | A | 5/2013 |
| JP | 2013203776 | A | 10/2013 |
| JP | 2013249354 | A | 12/2013 |
| JP | 2014001164 | A | 1/2014 |
| KR | 20030083158 | | 10/2003 |
| WO | 9206161 | A1 | 4/1992 |
| WO | 9316162 | A1 | 8/1993 |
| WO | 93019149 | A1 | 9/1993 |
| WO | 94003572 | A1 | 2/1994 |
| WO | 94012609 | A1 | 6/1994 |
| WO | 95002390 | A1 | 1/1995 |
| WO | 96018711 | A1 | 6/1996 |
| WO | 97004056 | A1 | 2/1997 |
| WO | 9711146 | A1 | 3/1997 |
| WO | 97011146 | A1 | 3/1997 |
| WO | 98011185 | A1 | 3/1998 |
| WO | 98012294 | A1 | 3/1998 |
| WO | 98050510 | A1 | 11/1998 |
| WO | 98055569 | A1 | 12/1998 |
| WO | 99000474 | A1 | 1/1999 |
| WO | 01000779 | A1 | 1/2001 |
| WO | 03080780 | A1 | 10/2003 |
| WO | 2006124484 | A1 | 11/2006 |
| WO | 2007045991 | A1 | 4/2007 |
| WO | 2008088647 | A1 | 7/2008 |
| WO | 2008094718 | A1 | 8/2008 |
| WO | 2009127367 | A1 | 10/2009 |
| WO | 2011075642 | A1 | 6/2011 |
| WO | 2011131272 | A1 | 11/2011 |
| WO | 2012061092 | A1 | 5/2012 |
| WO | 2012061094 | A1 | 5/2012 |
| WO | 2012061095 | A1 | 5/2012 |
| WO | 2012061103 | A2 | 5/2012 |
| WO | 2013162926 | A1 | 10/2013 |
| WO | 2014163947 | A1 | 10/2014 |
| WO | 2015006300 | A1 | 1/2015 |

OTHER PUBLICATIONS

CCI, "Poly Suga Nate, Sulfonated Poly (Alkyl Polyglucosides) Low Irritation Surfactants", 2 pages. Dec. 31, 2009.
CCI, "Poly Suga Phos, Naturally Derived Gemini Surfactants", 2 pages. Dec. 31, 2007.
CCI, "Suga Nate, Sulfonated Alkyl Polygucosides Low and No. Eye Irritation Surfactants", 4 pages. Dec. 31, 2007.
CCI, "Suga Quat Series, Unique Cationic Conditioners", 4 pages. Dec. 31, 2007.
CCI, "Colonial Chemical Material Safety Data Sheet", for Poly Suga Mate L, 2 pages. Dec. 31, 2008.
DEHYPON LS 36, "Product Data Sheet", Cognis Care Chemicals, Revision 4.1. Sep. 23, 2014.
GLUCOPON 625 UP, www.cognis.com, 2 pages. Aug. 18, 2008.
GLUCOPON Surfactants, "All You Need for Environmentally Friendly & Safe Cleansing Applications", Cognis Corporation, 1 page. Jun. 30, 2006.
Malik et al., "Alkaline Hard-Surface Cleaners Containing Alkyl Glucosides", United States Statutory Invention Registration No. H468. May 3, 1988.
Oleon, "Safety Data Sheet for Radia Easysurf 6781", 3 pages. Dec. 31, 2009.
Ecolab Inc. et al., PCT/IB2010/055009 filed Nov. 4, 2010, "International Search Report", mailed Jun. 26, 2011.
Ecolab USA Inc. et al., PCT/IB2011/052665 filed Jun. 17, 2011, The International Search Report and the Written Opinion of the International Searching Authority, or the Declaration, mailed Feb. 10, 2012.
Plurafac SL-42 Linear Alcohol Alkoxylate, BASF, 2 pages. Dec. 31, 2002.
Plurafac SL-42 Linear Alcohol Alkoxylate, Technical Bulletin BASF, 2 pages. Dec. 31, 2007.
Stepan, "Environmentally-Friendly Solvents Typical Properties", 4 pages. Dec. 31, 2010.
Stepan, "Graffiti Remover", Formulation, 2 pages. Feb. 8, 2011.
Stepan, "Heavy-Duty Concrete Cleaner", Formulation, 2 pages. Feb. 8, 2011.
Stepan, "Industrial Metal Cleaner", Formulation, 2 pages. Feb. 8, 2011.
Stepan, "Industrial Non-Aqueous Metal Cleaner", Formulation, 2 pages. Dec. 10, 2010.
Stepan, "Industrial Ready-To-Use Printing Press Ink Cleaner", Formulation, 2 pages. Feb. 8, 2011.
Stepan, "Industrial Solvent Degreaser", Formulation, 2 pages. Feb. 8, 2011.
Stepan, "Material Safety Data Sheet, Steposol M-8-10", Version 7, 4 pages, Revised Apr. 2, 2013.
Stepan, "Material Safety Data Sheet, Steposol M-10", Version 8, 4 pages, Revised Apr. 2, 2013.
Stepan, "Product Bulletin, Steposol M-8-10", 2 pages. Sep. 30, 2013.
Stepan, "Product Bulletin, Steposol M-10", 2 pages. Sep. 30, 2013.
Stepan, "The Degreasing Power of Steposol M-8-10", 2 pages. Jun. 30, 2012.
Suga Phos, "Natural Gemini Surfactant for Personal Care", CCI, 6 pages. Jul. 18, 2006.
The Original APG, "Made in USA—Designed for Global Home Care/1+1 Applications", Cognis Corporation, 1 page. Apr. 30, 2006.

* cited by examiner

ALKYL AMIDES FOR ENHANCED FOOD SOIL REMOVAL AND ASPHALT DISSOLUTION

CROSS-REFERENCE TO RELATED APPLICATIONS

This is a Continuation Application of U.S. Ser. No. 16/250,735, filed Jan. 17, 2019, which is a Continuation Application of U.S. Ser. No. 14/201,265, filed Mar. 7, 2014, both of which are herein incorporated by reference in their entirety.

FIELD OF THE INVENTION

The present invention relates to the field of cleaning compositions and solvents used therein. In particular, the invention relates to an environmentally friendly solvent component of alkyl amides for cleaning including but not limited to food and oily soil hard surface cleaning compositions, pot and pan soaking compositions, and asphalt dissolution.

BACKGROUND OF THE INVENTION

Solvents derived from renewable biological feedstocks that are non-toxic and have very good environmental properties are becoming highly desirable for replacement of many halogenated or other toxic solvents.

D-limonene is a biodegradable cleaning solvent and degreaser occurring in nature as the main component of citrus peel oil. These user-friendly characteristics encourage the use of d-limonene in solvent applications. However, d-limonene lacks some physical properties that limit its applicability to more widespread use.

D-limonene is not water-miscible and consequently not easily water-rinsable and is considered a non-aqueous cleaning solvent. D-limonene is a slow-drying solvent, that does not quickly evaporate off of surfaces to which it has been applied.

In many other cleaning applications, water miscibility is important. Being able to rinse a solvent-cleaned surface with water after the solvent cleaning step is preferable to rinsing with an organic solvent. Furthermore, aqueous rinses are often easier to handle and dispose of after application. Thus, water rinse ability is highly desirable in a cleaning solvent for economic and environmental reasons.

It is an object of the present invention to provide cleaning compositions that include environmentally desirable solvent components and which also provide superior cleaning of surfaces as a replacement for d-limonene or other solvents with limitations enumerated herein.

SUMMARY OF THE INVENTION

The present invention comprises a cleaning composition including an environmentally friendly alkyl amide solvent derived from renewable bio-based resources that works at least as well as d-limonene. In one embodiment, the present invention is a cleaning composition including a surfactant, an alkyl amide solvent, an optional chelating agent and water. The composition may be substantially free of d-limonene.

In one aspect, the present technology provides a cleaning composition having about 0.5 wt. % to about 30 wt. % solvent; about 5.0 wt. % to about 40 wt. % of one or more surfactants and 0.1 wt. % to about 90 wt. % of a carrier, wherein the solvent is an alkyl amide solvent, derivatives thereof and/or combinations thereof. In some aspects, the cleaning composition can contain other functional additives such as a chelant, a water conditioner, a co-solvent and the like.

In another aspect, the present technology provides a hard surface cleaning composition comprising about 0.5 wt. % to about 30 wt. % solvent; about 5.0 wt. % to about 40 wt. % of one or more surfactants and 0.1 wt. % to about 90 wt. % of a carrier, wherein the solvent is an alkyl amide solvent, derivatives thereof and/or combinations thereof; and wherein the hard surface cleaner provides at least equivalent cleaning performance when compared with a hard surface cleaner with a d-limonene solvent. In some aspects, the hard surface cleaner is diluted at least 1:10 with water. In other aspects, the hard surface cleaner is diluted at least 1:50, alternatively 1:100, alternatively 1:500, alternatively 1:1000 in water.

In another aspect, the present technology provides a pre-soak dishwashing composition comprising: 0.5 wt. % to about 30 wt. % solvent; about 5.0 wt. % to about 40 wt. % of one or more surfactants and 0.1 wt. % to about 90 wt. % of a carrier, wherein the solvent is an alkyl amide solvent, derivatives thereof and/or combinations thereof. The pre-soak composition provides at least equivalent cleaning performance when compared with the same pre-soak dishwashing with D-limonene as a solvent instead of the alkyl amide.

In yet another aspect, the present technology provides a ready to use cleaning composition comprising an at least 1:10 dilution of a composition comprising 5.0 wt. % to about 40 wt. % of one or more surfactants and 0.1 wt. % to about 90 wt. % of a carrier, wherein the solvent is an alkyl amide solvent, derivatives thereof and/or combinations thereof. The ready to use cleaning composition provides at least equivalent foam performance when compared with the same ready to use composition containing d-limonene as a solvent.

In another embodiment, the present invention is a method of removing soils from a surface. The method includes diluting a cleaner with water of dilution to form a use solution and contacting the surface with the use solution. In one embodiment, the cleaner includes 0.5 wt. % to about 30 wt. % solvent; about 5.0 wt. % to about 40 wt. % of one or more surfactants and 0.1 wt. % to about 90 wt. % of a carrier, wherein the solvent is an alkyl amide solvent, derivatives thereof and/or combinations thereof. The composition may optionally include one or more functional ingredients such as a pH adjuster, a chelator, and/or a water conditioning agent. The use solution is capable of removing soils including up to 20% proteins.

In yet another aspect the present technology provides an aqueous composition for dissolving petroleum or asphalt in primary and secondary petroleum recovery methods. Petroleum recovery is typically accomplished by drilling into a petroleum containing formation and the solvent containing composition of the invention may be used to enhance the same by dissolving petroleum deposits that have accumulated on the drill. They may also be used to enhance recovery in secondary recovery methods, such as those containing viscous petroleum/asphalt. In such cases, such as water flooding, steam injection, gas flooding and combinations thereof, the composition may be used to enhance petroleum recovery by dissolving petroleum in the deposit for extraction. Methods include injecting an aqueous composition of the invention to dissolve and force residual petroleum in an underground formation to one or more recovery wells.

In one aspect, embodiments disclosed herein relate to a process for enhanced oil recovery. The process includes the steps of providing an amide solvent containing composition of the invention to provide an oil recovery solution; and introducing the oil recovery solution into an earthen formation at a pressure to provide for enhanced oil recovery. In another aspect, the embodiments disclosed herein relate to a process for enhanced oil recovery including the steps of providing an amide solvent containing composition of the invention to provide an oil recovery solution; and introducing the oil recovery solution into an earthen formation where drilling is taking place to remove deposits lodged on the drill.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE INVENTION

Figure 1:
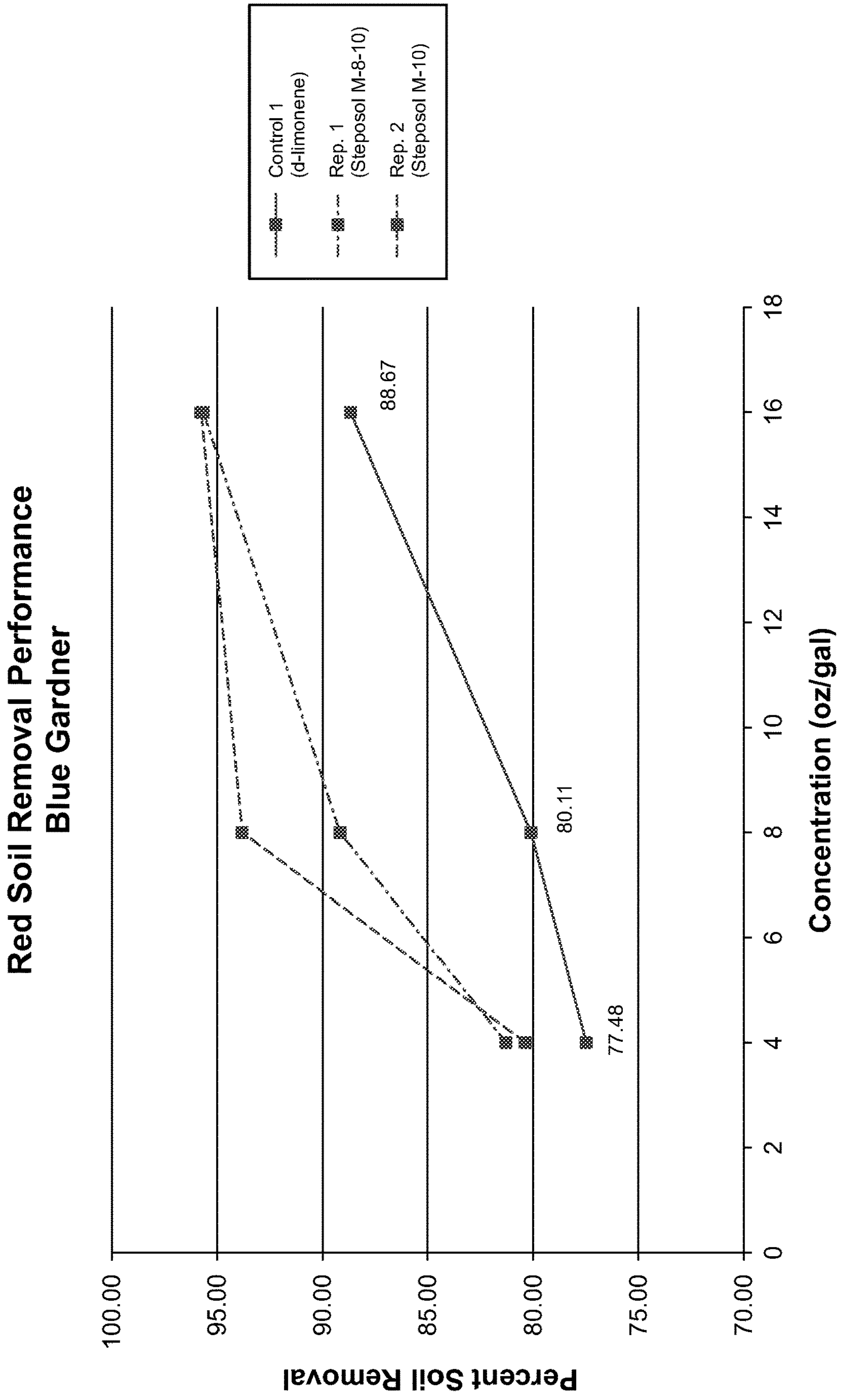
FIG. 1 is a graph showing the results of red food soil removal with compositions of the invention compared to control compositions with d-limonene.

Other than in the operating examples, or where otherwise indicated, all numbers expressing quantities of ingredients or reaction conditions used herein are to be understood as being modified in all instances by the term “about”.

As used herein, weight percent (wt-%), percent by weight, % by weight, and the like are synonyms that refer to the concentration of a substance as the weight of that substance divided by the total weight of the composition and multiplied by 100. Weight percents are reported at 18% actives unless otherwise specified.

As used herein, the term “about” modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term “about,” the claims include equivalents to the quantities.

The term “alkyl” refers to a straight or branched chain monovalent hydrocarbon radical having a specified number of carbon atoms. Alkyl groups may be unsubstituted or substituted with substituents that do not interfere with the specified function of the composition and may be substituted once or twice with the same or different group. Substituents may include alkoxy, hydroxy, mercapto, amino, alkyl substituted amino, nitro, carboxy, carbonyl, carbonyloxy, cyano, methylsulfonylamino, or halogen, for example. Examples of “alkyl” include, but are not limited to, methyl, ethyl, n-propyl, isopropyl, n-butyl, s-butyl, t-butyl, n-pentyl, n-hexyl, 3-methylpentyl, and the like.

The term “surfactant” or “surface active agent” refers to an organic chemical that when added to a liquid changes the properties of that liquid at a surface.

“Cleaning” means to perform or aid in soil removal, bleaching, microbial population reduction, rinsing, or combination thereof.

As used herein, the term “substantially free” refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt-% and in yet another embodiment, the amount of component is less than 0.01 wt. %.

As used herein, the term “ware” includes items such as eating and cooking utensils. As used herein, the term “ware washing” refers to washing, cleaning, or rinsing ware.

As used herein, the term “hard surface” includes showers, sinks, toilets, bathtubs, countertops, windows, mirrors, transportation vehicles, floors, and the like. These surfaces can be those typified as “hard surfaces” (such as walls, floors, bed-pans).

It should be noted that, as used in this specification and the appended claims, the singular forms “a,” “an,” and “the” include plural referents unless the content clearly dictates otherwise. Thus, for example, reference to a composition containing “a compound” includes a mixture of two or more compounds. It should also be noted that the term “or” is generally employed in its sense including “and/or” unless the content clearly dictates otherwise.

The term “actives” or “percent actives” or “percent by weight actives” or “actives concentration” are used interchangeably herein and refers to the concentration of those ingredients involved in cleaning expressed as a percentage minus inert ingredients such as water or salts.

The term “substantially similar cleaning performance” refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a alkyl phenol ethoxylate-containing cleaning to address a typical soiling condition on a typical substrate. This degree of cleanliness may, depending on the particular cleaning product and particular substrate, correspond to a general absence of visible soils, or to some lesser degree of cleanliness, as explained in the prior paragraph.

Alkyl Amide Solvent Containing Compositions

The present invention relates to cleaning compositions and methods of using the cleaning compositions for cleaning and removing organic soils from a surface in any of a number of embodiments, such as pot and pan pre-soaks, hard surface cleaners, or petroleum recovery.

In particular, the cleaning composition is effective at removing food soils including proteins, lard and oils from various surfaces. For example, the cleaning composition is effective at removing soils containing up to about 20% protein. The cleaning composition is also effective at removing oily soils including such things as clay, and motor oil and dissolving asphalt.

The cleaning compositions include an environmentally friendly alkyl amide solvent, derived from renewable bio-based resources. In one embodiment, the present invention is a cleaning composition including a surfactant, an alkyl amide solvent, and water. The composition may be substantially free of d-limonene.

In one aspect, the present technology provides a cleaning composition having about 0.5 wt. % to about 30 wt. % solvent; about 5.0 wt. % to about 40 wt. % of one or more surfactants and 0.1 wt. % to about 90 wt. % of a carrier, wherein the solvent is an alkyl amide solvent, derivatives thereof and/or combinations thereof. In some aspects, the cleaning composition can contain other functional additives such as a chelant, a water conditioner, and the like.

Thus, the cleaning compositions provide a green, readily biodegradable renewable, replacement for conventional detergent solvents. The cleaning compositions can be used in various industries, including, but not limited to: manual and automatic ware washing, vehicle washing, food and beverage, vehicle care, quick service restaurants, petroleum recovery and textile care. In particular, the cleaning compositions can be used in hard-surface cleaning applications, including, for example: bathroom surfaces, dishwashing equipment, food and beverage equipment, vehicles and tabletops. The cleaning compositions can also be used in pot and pan pre-soak embodiments.

COMPOSITIONS OF THE INVENTION

Alkyl Amide Solvent

Alkyl amides useful for the present invention include those with the formula:

$$R^1CO—NR^2R^3$$

where $R_1$ is $R^4—C_9H_6—$ or $R^5O_2C—C_6H_3O—$; $R^4$ is hydrogen or $C_1$-$C_7$ alkyl; $R^5$ is substituted or unsubstituted alkyl, aryl, alkenyl, oxyalkylene, polyoxyalkylene, glyceryl ester, or a mono- or divalent cation; and each of $R^2$ and $R^3$ is independently H, $C_1$-$C_6$ alkyl, or $—CH_2CH_2OR^6$ where $R^6$ is H or C $C_6$ alkyl. Preferably, the R groups are saturated.

Particularly preferred are $C_8$-$C_{10}$ dimethyl amides. One example of alkyl amides useful for the invention include the line of Steposol amides, including, for example, Steposol® M8-10 (N, N-dimethyloctanamide) (N,N-dimethylcaprylamide) and N,N-dimethyl-decanamide (N,N-dimethylcapramide)), and Steposol® M10 (N,N-dimethyl-decanamide (N,N-dimethylcapramide)) commercially available from Stepan Company, Northfield. Illinois.

The composition of the include from about 0.5 wt. % to about 30 wt. % of an alkyl amide solvent; preferably about 1.0 wt. % to about 25 wt. % and most preferably from about 5.0 wt. % to about 20 wt. %. In general, the alkyl amide solvent may replace a d-limonene solvent on a 1:1 wt. % basis.

Surfactants

The cleaning composition contains a detersive amount of an anionic surfactant or a mixture of anionic surfactants. Anionic surfactants are desirable in cleaning compositions because of their wetting and detersive properties. The anionic surfactants that can be used according to the invention include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clariant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauric ether ethoxylate sulfate and is available under the name Steol CS-460.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine.

If a mixture of salts is used, a suitable mixture of alkaline metal salt can be sodium and magnesium, and the molar ratio of sodium to magnesium can be between about 3:1 and about 1:1.

In a preferred embodiment the anionic surfactant is an amine salt form of the anionic surfactant.

The cleaning composition, when provided as a concentrate, can include the anionic surfactant component in an amount sufficient to provide a use composition having desired wetting and detersive properties after dilution with water. The composition can contain from about 5 wt. % to about 40 wt. %, about 10 wt. % to about 35 wt. %, and 15 wt. %, about 30 wt. % to and similar intermediate concentrations of the anionic surfactant.

Neutralizing Agent

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, a suitable mixture of alkaline metal salt can be sodium and magnesium, and the molar ratio of sodium to magnesium can be between about 3:1 and about 1:1. When present, the neutralizing agent is present in any amount sufficient to neutralize the anionic surfactant. Examples of typical amounts can be from about 0 wt. % to about 35 wt. %, about 0 wt. % to about 30 wt. %, and 0 wt. %, about 25 wt. %.

Polar Carrier

The cleaning composition also includes a carrier, such as water. It should be appreciated that the water may be provided as deionized water or as softened water. The water provided as part of the concentrate can be relatively free of hardness. It is expected that the water can be deionized to remove a portion of the dissolved solids. Although deionized water is preferred for formulating the concentrate, the concentrate can be formulated with water that has not been deionized. That is, the concentrate can be formulated with water that includes dissolved solids, and can be formulated with water that can be characterized as hard water. The amount of water in a liquid cleaning composition of the invention is preferably from about 0% to about 99% by weight of the total composition, alternatively from about 0.1% to about 90%, alternatively between about 1% and about 85%, alternatively about 5% to about 80% by weight of the total composition. Alternatively, the amount of principal carrier, e.g., water, can be in a percentage as to bring the total percentage of the composition to 100%.

Water Conditioning Agent/Chelant

The water conditioning agent/chelant is optional, but preferred and aids in removing metal compounds and in reducing harmful effects of hardness components in service water. Exemplary water conditioning agents include chelating agents, sequestering agents and inhibitors. Polyvalent metal cations or compounds such as a calcium, a magnesium, an iron, a manganese, a molybdenum, etc. cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the invention. Both organic and inorganic water conditioning agents are common and can be used. Inorganic water conditioning agents include such compounds as sodium tripolyphosphate and other higher linear and cyclic polyphosphates species. Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. Small molecule organic water conditioning agents include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS). All of these are known and commercially available.

The composition of the include from about 0.01 wt. % to about 15 wt. % of an water conditioning agent/chelant; preferably about 0.05 wt. % to about 10 wt. % and most preferably from about 0.1 wt. % to about 5 wt. %.

Additional Surfactant

The cleaning composition can contain additional surfactants such as nonionic, amphoteric, or cationic surfactants. Nonionic surfactants can be included in the cleaning composition to enhance grease removal properties. Although the additional surfactant component can include a nonionic surfactant component, it should be understood that the nonionic cosurfactant component can be excluded from the detergent composition.

Nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt. %.

Additional nonionic surfactants include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauramide diethanolamide, cocoamide diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt. % to about 15 wt. %. The concentrate can include about 0.1 wt. % to about 1.0 wt. %, 0.5 wt. % to about 12 wt. % or about 2 wt. % to about 10 wt. % of the amphoteric surfactant.

The cleaning composition can contain a cationic surfactant component that includes a detersive amount of cationic surfactant or a mixture of cationic surfactants. The cationic surfactant can be used to provide sanitizing properties.

Cationic surfactants that can be used in the cleaning composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. When the detergent composition includes an cationic surfactant, the cationic surfactant can be included in an amount of about 0.1 wt. % to about 15 wt. %. The concentrate can include about 0.1 wt. % to about 1.0 wt. %, 0.5 wt. % to about 12 wt. % or about 2 wt. % to about 10 wt. % of the cationic surfactant.

Additional Solvent

In addition to the alkyl amide solvent, the compositions may also contain cosolvents or additional solvent to further enhance soil removal properties. Such additional solvents may be used to adjust the viscosity of the final composition. The intended final use of the composition may determine whether or not an additional solvent or cosolvent is included in the cleaning composition. The solvent may or may not be included to improve soil removal, handle ability or ease of use of the compositions of the invention. Suitable solvents useful in removing hydrophobic soils include, but are not limited to: oxygenated solvents such as lower alkanols, lower alkyl ethers, glycols, aryl glycol ethers and lower alkyl glycol ethers. Examples of other solvents include, but are not limited to: methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Substantially water soluble glycol ether solvents include, not are not limited to: propylene glycol methyl ether, propylene glycol propyl ether, dipropylene glycol methyl ether, tripropylene glycol methyl ether, ethylene glycol butyl ether, diethylene glycol methyl ether, diethylene glycol butyl ether, ethylene glycol dimethyl ether, ethylene glycol propyl ether, diethylene glycol ethyl ether, triethylene glycol methyl ether, triethylene glycol ethyl ether, triethylene glycol butyl ether and the like. In a preferred embodiment, the composition is substantially free of d-limonene. When additional solvent is present, the composition can contain from about 0 wt. % to about 40 wt. %, preferably from about 0 wt. % to about 35 wt. %, and more preferably from about 0 wt. %, about 30 wt. % and similar intermediate concentrations of the solvent. In a preferred embodiment the composition include a cosolvent of glycol ether.

In one embodiment, the cleaning compositions of the present invention are substantially free of d-limonene or any nonrenewable solvents, making the detergent composition more environmentally acceptable. D-limonene-free refers to a composition, mixture, or ingredients to which D-limonene is not added. Should d-limonene be present through contamination, the level of d-limonene in the resulting composition is less than approximately 0.5 wt. %, less than approximately 0.1 wt %, and often less than approximately 0.01 wt. %.

Additional Functional Materials

The cleaning composition can include additional components or agents, such as additional functional materials. The functional materials provide desired properties and functionalities to the cleaning composition. For the purpose of this application, the term "functional materials" include a material that when dispersed or dissolved in a use and/or concentrate solution, such as an aqueous solution, provides a beneficial property in a particular use. The cleaning preparations containing the alkyl amide solvent may optionally contain other soil-digesting components, co-surfactants, disinfectants, sanitizers, acidulants, complexing agents, corrosion inhibitors, foam inhibitors, dyes, thickening or gelling agents, and perfumes, as described, for example, in U.S. Pat. No. 7,341,983, incorporated herein by reference. Some particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Thickening Agents

The viscosity of the cleaning composition increases with the amount of thickening agent, and viscous compositions are useful for uses where the cleaning composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt. % to about 3 wt. %, from about 0.1 wt. % to about 2 wt. %, or about 0.1 wt. % to about 0.5 wt. %.

Bleaching Agents

The cleaning composition may also include bleaching agents for lightening or whitening a substrate. Examples of suitable bleaching agents include bleaching compounds capable of liberating an active halogen species, such as $Cl_2$, $Br_2$, $—OCl^-$ and/or $—OBr^-$, under conditions typically encountered during the cleansing process. Suitable bleaching agents for use in the present cleaning compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein for all purposes). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition can include an effective amount of a bleaching agent. When the concentrate includes a bleaching agent, it can be included in an amount of about 0.1 wt. % to about 60 wt. %, about 1 wt. % to about 20 wt. %, about 3 wt. % to about 8 wt. %, and about 3 wt. % to about 6 wt. %.

Detergent Fillers

The cleaning composition can include an effective amount of detergent fillers, which does not perform as a cleaning agent per se, but cooperates with the cleaning agent to enhance the overall cleaning capacity of the composition. Examples of detergent fillers suitable for use in the present cleaning compositions include sodium sulfate, sodium chloride, starch, sugars, $C_1$-$C_{10}$ alkylene glycols such as propylene glycol, and the like. When the concentrate includes a detergent filler, it can be included in an amount of between about 1 wt. % and about 20 wt. % and between about 3 wt. % and about 15 wt. %.

Defoaming Agents

The cleaning composition can include a defoaming agent to reduce the stability of foam and reduce foaming. When the concentrate includes a defoaming agent, the defoaming agent can be provided in an amount of between about 0.01 wt. % and about 3 wt. %.

Examples of defoaming agents that can be used in the composition includes ethylene oxide/propylene oxide block copolymers such as those available under the name Pluronic N3, silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Antiredeposition Agents

The cleaning composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. When the concentrate includes an anti-redeposition agent, the anti-redeposition agent can be included in an amount of between about 0.5 wt. % and about 10 wt. % and between about 1 wt. % and about 5 wt. %.

Stabilizing Agents

Stabilizing agents that can be used in the cleaning composition include, but are not limited to: primary aliphatic amines, betaines, borate, calcium ions, sodium citrate, citric acid, sodium formate, glycerine, malonic acid, organic diacids, polyols, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to about 20 wt. %, between about 0.5 wt. % to about 15 wt. % and between about 2 wt. % to about 10 wt. %.

Dispersants

Dispersants that can be used in the cleaning composition include maleic acid/olefin copolymers, polyacrylic acid, and its copolymers, and mixtures thereof. The concentrate need not include a dispersant, but when a dispersant is included it can be included in an amount that provides the desired dispersant properties. Exemplary ranges of the dispersant in the concentrate can be up to about 20 wt. %, between about 0.5 w.% and about 15 wt. %, and between about 2 wt. % and about 9 wt. %.

Hydrotropes

The compositions of the invention may optionally include a hydrotrope that aides in compositional stability and aqueous formulation. Functionally speaking, the suitable hydrotrope couplers which can be employed are non-toxic and retain the active ingredients in aqueous solution throughout the temperature range and concentration to which a concentrate or any use solution is exposed.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. Preferred coupling agents for use in the present invention include n-octanesulfonate, available as NAS 8D from Ecolab Inc., n-octyl dimethylamine oxide, and the commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of $C_6$-$C_{24}$ alcohol alkoxylates (alkoxylate means ethoxylates, propoxylates, butoxylates, and co-or-terpolymer mixtures thereof) (preferably $C_6$-$C_{14}$ alcohol alkoxylates) having 1 to about 15 alkylene oxide groups (preferably about 4 to about 10 alkylene oxide groups); $C_6$-$C_{24}$ alkylphenol alkoxylates (preferably $C_8$-$C_{10}$ alkylphenol alkoxylates) having 1 to about 15 alkylene oxide groups (preferably about 4 to about 10 alkylene oxide groups); $C_6$-$C_{24}$ alkylpolyglycosides (preferably $C_6$-$C_{20}$ alkylpolyglycosides) having 1 to about 15 glycoside groups (preferably about 4 to about 10 glycoside groups); $C_6$-$C_{24}$ fatty acid ester ethoxylates, propoxylates or glycerides; and $C_4$-$C_{12}$ mono or dialkanolamides. A preferred hydrotope is sodium xylenesidfonate (SXS).

The composition of an optional hydrotrope can be present in the range of from about 0 to about 25 percent by weight.

Dyes and Fragrances

Various dyes, odorants including perfumes, and other aesthetic enhancing agents may also be included in the cleaning composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (BASF), Pylakor Acid Bright Red (Pylam), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Adjuvants

The present composition can also include any number of adjuvants. Specifically, the composition can include stabilizing agents, wetting agents, thickeners, foaming agents, corrosion inhibitors, biocides, hydrogen peroxide, pigments or dyes among any number of other constituents which can be added to the composition. Such adjuvants can be preformulated with the present composition or added to the system simultaneously, or even after, the addition of the present composition. The composition can also contain any number of other constituents as necessitated by the application, which are known and which can facilitate the activity of the present compositions.

Embodiments of the Present Compositions

The cleaning composition of the present invention is effective at removing soils containing proteins, lard and oils. In one embodiment, the cleaning composition is effective at removing soils containing up to about 20% protein. Several suitable exemplary liquid concentrate compositions are provided in the following table. In general, d-limonene is replaced 1:1 at the actives level in all formulations with alkyl amides.

TABLE 1

Exemplary Compositions

| Component | First Range (Wt. %) | Second Range (Wt. %) | Third Range (Wt. %) |
|---|---|---|---|
| Water | 0.1-90 | 1-85 | 5-80 |
| Amide solvent | 0.5-30 | 1-25 | 5-20 |
| Anionic surfactant | 5-40 | 10-35 | 15-30 |
| chelant | 0-15 | 0-10 | 0-5 |
| Additional solvent | 0-30 | 0-25 | 0-20 |

The concentrate composition of the present invention can be provided as a solid, liquid, or gel, or a combination thereof. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms "capsule" and "pellet" are used for exemplary purposes and are not intended to limit the delivery mode of the invention to a particular shape.

When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning. When the cleaning composition is provided as a solid, the compositions provided above may be altered in a manner to solidify the cleaning composition by any means known in the art. For example, the amount of water may be reduced or additional ingredients may be added to the cleaning composition, such as a solidification agent.

In another embodiment, the solid concentrate composition can be diluted through dispensing equipment whereby water is sprayed at the solid block forming the use solution. The water flow is delivered at a relatively constant rate using mechanical, electrical, or hydraulic controls and the like. The solid concentrate composition can also be diluted through dispensing equipment whereby water flows around the solid block, creating a use solution as the solid concentrate dissolves. The solid concentrate composition can also be diluted through pellet, tablet, powder and paste dispensers, and the like.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

It is expected that the concentrate will be diluted with the water of dilution in order to provide a use solution having a desired level of detersive properties. If the use solution is required to remove tough or heavy soils, it is expected that the concentrate can be diluted with the water of dilution at a weight ratio of at least 1:1 and up to 1:8. If a light duty cleaning use solution is desired, it is expected that the concentrate can be diluted at a weight ratio of concentrate to water of dilution of up to about 1:256.

In an alternate embodiment, the cleaning compositions may be provided as a ready-to-use (RTU) composition. If the cleaning composition is provided as a RTU composition, a more significant amount of water is added to the cleaning composition as a diluent. When the concentrate is provided as a liquid, it may be desirable to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little water as possible in order to reduce transportation costs, it is also desirable to provide a concentrate that can be dispensed accurately. In the case of a liquid concentrate, it is expected that water will be present in an amount of up to about 90 wt. %, particularly between about 20 wt. % and about 85 wt. %, more particularly between about 30 wt. % and about 80 wt. % and most particularly between about 50 wt. % and about 80 wt. %.

In the case of a RTU composition, it should be noted that the above-disclosed cleaning composition may, if desired, be further diluted with up to about 96 wt. % water, based on the weight of the cleaning composition.

Compositions of the invention may be useful to clean a variety of surfaces. Invention compositions may be used to clean soils on hard surfaces including but not limited to ceramics, ceramic tile, grout, granite, concrete, mirrors, enameled surfaces, metals including aluminum, brass, stainless steel and the like. Compositions of the invention may also be used to clean soiled linens such as towels, sheets, and nonwoven webs. As such, compositions of the invention are useful to formulate hard surface cleaners, laundry detergents, oven cleaners, hand soaps, automotive detergents, and ware washing detergents whether automatic or manual.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used

- Steposol M-8-10 a distributed amide: N,N-dimethyloctanamide (N,N-dimethylcaprylamide) and N,N-dimethyldecanamide (N,N-dimethylcapramide) commercially available from Stepan Company, Northfield, Illinois 60093.
- Steposol M-10 N,N-dimethyldecanamide (N,N-dimethylcapramide) commercially available from Stepan Company, Northfield, Illinois 60093.

Red Food Soil Removal Test

A red food soil consisting of lard, oil, protein, and iron (III) oxide (for color) was prepared. About 30 grams of lard was combined with about 30 grams of corn oil, about 15 grams of whole powdered egg, and about 1.5 grams of $Fe_2O_3$. The soil has 20% protein content.

The back, grooved sides of a plurality of 3"×3" white vinyl tiles were soiled with approximately 0.75 grams of the red food soil using a 3" foam brush. The tiles were allowed to dry at room temperature overnight. It is believed that this incubation period allowed the bonds holding the triglycerides and proteins together in the soil to begin to crystallize and interlink. The next day, the tiles were placed into a soaking tray containing about 200 grams of a test composition for about 1 minute.

The soil removal test was conducted using a Gardner Straightline Apparatus with a synthetic sponge. The synthetic sponge was pre-dampened with water with the excess water squeezed out and then saturated with about 50 grams of the test compositions. The tiles were then placed into the Gardner Straightline Apparatus with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360 degree rotation of the tiles. The tiles were then rinsed with city water and dried overnight at room temperature. Hunter Lab L* reflectance of the soiled tiles and washed tiles were measured. The soiled tiles L* reflectance value is represented by the following equation:

$$\text{soiled } L'^* = \frac{1}{3.38\ln\left(\frac{92.1-24.74}{\text{soiled } L^*-24.74}\right)}$$

where 3.38, 92.1, and 24.74 are constants. The washed tiles L* reflectance value is represented by the following equation:

$$\text{washed } L'^* = \frac{1}{3.38\ln\left(\frac{92.1-24.74}{\text{washed } L^*-24.74}\right)}$$

The percent soil removal was then calculated as:

$$\text{percent soil removal} = \left(\frac{\text{soiled } L'^* - \text{washed } L'^*}{\text{soiled } L'^*}\right) * 100$$

The compositions were evaluated based on the d-limonene containing control formula. If the composition removed an acceptable amount of red food soil at all concentrations, the compositions were then evaluated to determine whether they performed substantially similarly to, and could act as a suitable replacement for, a commercially known cleaner. Two compositions were considered to behave substantially similarly if the amount of red food soil removed was within about 10% at low and high concentrations and within about 15% at intermediate concentrations.

Black Oily Soil Removal Test

A black oily soil including about 50 grams mineral spirits, about 5 grams mineral oil, about 5 grams motor oil, about 2.5 grams oil dag and about 37.5 grams bandy black clay was prepared.

A plurality of 3"×3" white vinyl tiles were soiled on the back, grooved side with approximately 0.75 grams of the black oily test soil using a 3" foam brush. The tiles were allowed to dry at room temperature overnight. The next day, the tiles were placed into a soaking tray containing about 200 grams of the cleaning composition for about 2 minutes. The soil removal test was conducted using a Garner Straightline Apparatus with a synthetic sponge. The sponge was pre-dampened with water with the excess water squeezed out and then saturated with about 50 grams of the test compositions.

The tiles were then placed into the Gardner Straightline Apparatus with the grain of the tiles parallel to the direction of sponge travel. The tiles were then scrubbed with about 2 pounds of pressure with the moistened synthetic sponge for 40 cycles, rotating the tiles 90 degrees every 10 cycles for a complete 360 degree rotation of the tiles. The tiles were then rinsed with city water and dried overnight at room temperature. Hunter Lab L* reflectance of the soiled tiles and washed tiles were measured. The soiled tiles L* reflectance value is represented by the following equation:

$$\text{soiled } L'^* = \frac{1}{9.03 \ln\left(\frac{92.1 - 25.98}{\text{soiled } L^* - 25.98}\right)}$$

where 9.03, 92.1, and 25.98 are constants. The washed tiles L* reflectance value is represented by the following equation:

$$\text{washed } L'^* = \frac{1}{9.03 \ln\left(\frac{92.1 - 25.98}{\text{washed } L^* - 25.98}\right)}$$

The percent soil removal was then calculated as:

$$\text{percent soil removal} = \left(\frac{\text{soiled } L'^* - \text{washed } L'^*}{\text{soiled } L'^*}\right) * 100$$

The compositions were evaluated based on the d-limonene containing control formula.

Example 1

To test the ability of compositions of the present invention and comparative compositions to remove red food soil from a surface according to the method described above, various compositions were formulated at 4, 8 and 16 ounce per gallon concentrations Example 1 includes a commercially available degreaser composition (control A) with d-limonene, compared to the same degreaser composition with d-limonene replaced 1:1 with either Steposol M8-10 (Representative Composition of the Invention 1) or Steposol M-10 (Representative Composition of the Invention 2).

TABLE A

| Product | Concentration | Percent Red Food Soil Removal |
|---|---|---|
| Water | | 73.03 |
| Control (d-limonene) | 4 | 77.48 |
| Control (d-limonene) | 8 | 80.11 |
| Control (d-limonene) | 16 | 88.67 |
| Rep. 1 (Steposol M-8-10) | 4 | 81.30 |
| Rep. 1 (Steposol M-8-10) | 8 | 89.17 |
| Rep. 1 (Steposol M-8-10) | 16 | 95.65 |
| Rep. 2 (Steposol M-10) | 4 | 80.38 |
| Rep. 2 (Steposol M-10) | 8 | 93.82 |
| Rep. 2 (Steposol M-10) | 16 | 95.76 |

The example shows that the compositions with the alkyl amide replacing d-limonene cleaned better than the Control composition. The results are shown graphically in FIG. 1.

Example 2

Black Oily Soil Test results

Figure 2:
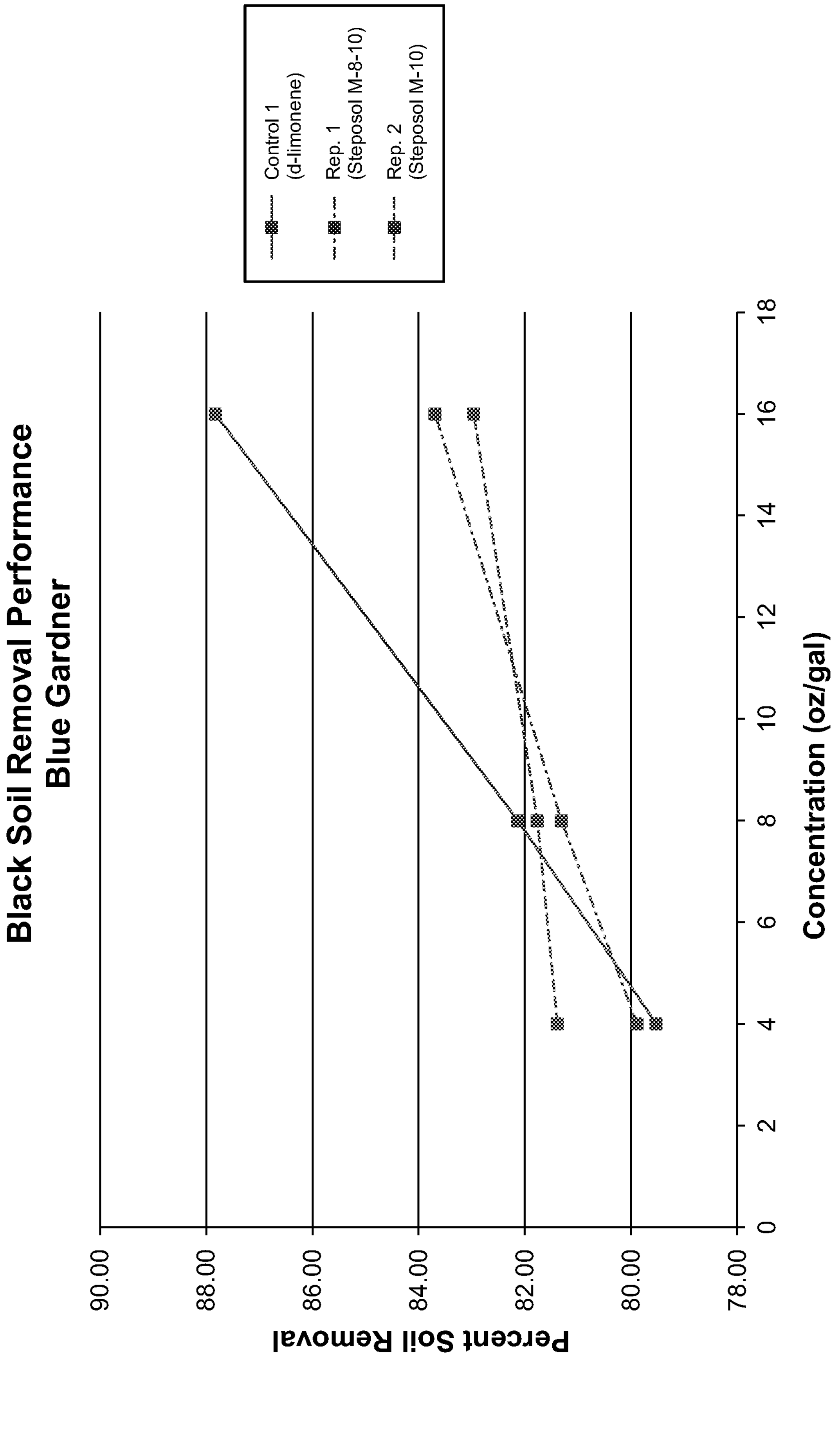
FIG. 2 is a graph showing the results of black oily soil removal with compositions of the invention compared to control compositions with d-limonene.

The same formulas in Example 1 were tested with black soil. The results are below in Table B and shown graphically in FIG. 2.

TABLE B

| Product | Concentration | Percent Black Oily Soil Removal |
|---|---|---|
| Water | | 68.07 |
| Control (d-limonene) | 4 | 79.52 |
| Control (d-limonene) | 8 | 82.13 |
| Control (d-limonene) | 16 | 87.83 |
| Rep. 1 (Steposol M-8-10) | 4 | 79.88 |
| Rep. 1 (Steposol M-8-10) | 8 | 81.31 |
| Rep. 1 (Steposol M-8-10) | 16 | 83.69 |
| Rep. 2 (Steposol M-10) | 4 | 81.39 |
| Rep 2 (Steposol M-10) | 8 | 81.77 |
| Rep 2 (Steposol M-10) | 16 | 82.96 |

The alkyl amide solvent containing composition performed in most dilutions at least as well as d-limonene on black soil.

Example 3

Asphalt Solubility Test

Place 0.25 gm asphalt cut-back (Gardner 0121 Foundation and Roof Coating) in bottom of vial. Allow to dry 3 days minimum.

Place 5 gm solvent in vial. Swirl. Observe.

A strong solvent will dissolve entire residue. The liquid will be black.

A medium strength solvent will dissolve part of the residue and the liquid will turn dark brown. A weak solvent will not dissolve any of the asphalt reside and will not turn color.

A table of various solvents and their ability to dissolve asphalt per the above test is below in Table C.

TABLE C

| Solvent | LVP | Asphalt Dissolution S = Soluble PS = Partially Soluble I—Insoluble |
|---|---|---|
| Hydrocarbon | | |
| d-Limonene | no | S |
| Canola methyl ester | Y | PS |
| Lauryl lactate | Y | PS |
| Ethyl laurate | Y | PS, S |
| Glycerol mono C8-10 | | PS |

TABLE C-continued

| Solvent | LVP | Asphalt Dissolution S = Soluble PS = Partially Soluble I—Insoluble |
|---|---|---|
| Amide/Amine | | |
| Dimethylcaprylamide | Y | S |
| Dimethyl capramide/caprylamide | Y | S |
| Ether | | |
| Dowanol TPnB | Y | PS |
| Hexyl cellosolve | | PS |
| Hexyl carbitol | | PS |
| Ionic Liquid | | |
| Oleyl ethylimidazolinium ethosulfate | | I |
| Isostearyl ethylimidazolinium ethosulfate | | I |
| Misc | | |
| MMB | | PS |
| Tall oil fatty acid | | PS |
| n-oleoyl sarcosine | | PS |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A cleaning composition consisting of:

(a) from 12 wt. % to about 30 wt. % of a $C_8$ and/or $C_{10}$ dimethyl alkyl amide solvent;

(b) an anionic surfactant;

(c) a cosolvent, wherein the cosolvent is a glycol ether;

(d) at least one neutralizing agent;

(e) a chelant;

(f) a pH adjuster; and (g) water.

2. The cleaning composition of claim 1 wherein said $C_8$ and/or $C_{10}$ dimethyl alkyl amide is saturated.

3. The cleaning composition of claim 1 wherein said anionic surfactant is a salt.

4. The cleaning composition of claim 3 wherein said salt is an amine salt.

5. The cleaning composition of claim 1, wherein the anionic surfactant is present in an amount between about 5 wt. % and about 40 wt. % of the cleaning composition.

6. The cleaning composition of claim 1, wherein the chelant is present in an amount between about 0.01 wt. % to about 15 wt. % of the cleaning composition.

7. The cleaning composition of claim 1 wherein said cleaning composition is a pot and pan pre-soaking composition, a hard surface cleaner or an asphalt dissolving composition.

8. An asphalt dissolving/hard surface cleaning/pot and pan pre-soak composition consisting of:

(a) from 13 wt. % to about 30 wt. % of a saturated $C_8$ and/or $C_{10}$ dimethyl alkyl amide solvent;

(b) an anionic surfactant amine salt;

(c) a cosolvent, wherein the cosolvent is a glycol ether;

(d) a neutralizing agent;

(e) a chelant;

(f) a pH adjuster; and (g) water.

9. The cleaning composition of claim 8, wherein the anionic surfactant is present in an amount between about 10 wt. % and about 35 wt. % of the cleaning composition.

10. The cleaning composition of claim 8, wherein the chelant is present in an amount between about 0.01 wt. % to about 15 wt. % of the cleaning composition.

11. The cleaning composition of claim 8, wherein the cleaning composition has a pH of between about 6.5 and about 10.

* * * * *